J. A. LOWE.

DRAIN SCREW ATTACHMENT FOR STENCH-TRAPS.

No. 7,117. Reissued May 16, 1876.

Witnesses:
M. Ryan
Fred. Haynes

James A. Lowe
by his Attorneys
Brown & Allen

N. PETERS, PHOTO-LITHOGRAPHER, WASHINGTON, D. C.

UNITED STATES PATENT OFFICE

JAMES A. LOWE, OF NEW YORK, N. Y.

IMPROVEMENT IN DRAIN-SCREW ATTACHMENTS FOR STENCH-TRAPS.

Specification forming part of Letters Patent No. 127,620, dated June 4, 1872; reissue No. 7,117, dated May 16, 1876; application filed May 4, 1876.

*To all whom it may concern:*

Be it known that I, JAMES A. LOWE, of the city, county, and State of New York, have invented a new and useful Improvement in Drain-Screw Attachments for Stench-Traps; and I do hereby declare that the following is a full, clear, and exact description of the same, reference being had to the accompanying drawing, which forms part of this specification:

This invention is applicable to water or stench traps, both when made with and without a seam of lead or other soft-metal or composition.

The invention consists in a novel construction of the joint of the trap-screw of a stench or water trap, whereby I am enabled to clamp the metal of the trap between the nut and the cap of the trap-screw. By this improvement I combine a stiff or solid and durable hard-metal bearing for the thread of the screw, with a soft-metal facing or seat for the cap or head or heel of the screw to make close or water-tight the drain-hole opening in the trap; also, by making the soft metal of the trap to overlap or lap upon the outer edge of the hard-metal nut or screw-box which forms the bearings for the thread of the screw, leakage between said nut and the soft metal of the trap is avoided.

When the trap is a cast one, said hard-metal nut or screw-box may be inserted or embedded within the lower curved portion of the trap or projection therefrom by the process of casting, and the invention will here be described as so applied.

Figure 1:
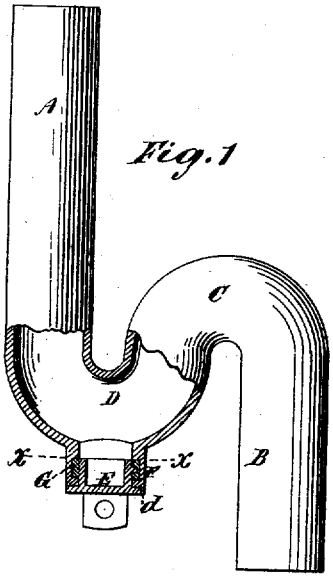
Figure 2:
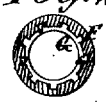

Figure 1 represents a partly-broken or sectional side view of a cast soft-metal trap with the invention applied; Fig. 2, a horizontal section on the line *x x*; and Fig. 3, a sectional elevation of the mold in part with cores and hard-metal nut as arranged for casting a trap in accordance with the invention.

A is the upper leg; B, the lower one of a cast soft-metal or composition trap, formed with an upper curved portion C and lower curved portion D, the latter of which has the opening in it for reception of the screw of the cap E, by which provision is made for clearing the trap, when required, of matter liable to choke or foul it. The opening in the lower curved portion D, however, does not receive the screw direct, and has not the female thread cast or formed in it, the softness of the metal or composition of which the trap is made being but poorly adapted, even though a course thread be used, to receive or hold the screw. Accordingly, while the lower curved portion D is formed with a bottom socket or branch, F, for reception of the screw of the cap, said screw is made to fit a hard-metal nut or box, G, inserted or embedded within said branch, yet a soft bearing is formed for the screw-cap to bear against by reason of the socket F being cast or formed with a facing or seat, *d*, beyond or outside of the nut for the head of the screw to make a close or tight joint with, and which it would be difficult or impossible to accomplish were the cap or head of the screw to bear against the hard metal of the nut or box. In this way I combine a stiff or solid and durable hard-metal bearing for the thread of the screw or cap with a soft-metal facing or seat for the head of it, and make the joint of the trap-screw by clamping the metal of the trap between the nut and the cap of the trap-screw. Furthermore, by making the soft metal of the trap to overlap or lap upon the outer edge of the hard-metal nut or screw-box, leakage between said nut and the soft metal of the trap is avoided.

Figure 3:
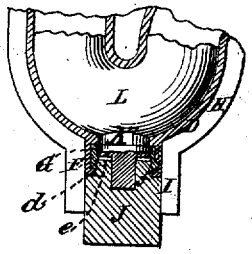

Fig. 3 of the drawing explains a mode of embedding, as described, the hard-metal nut or box G, which may be of brass, within the socket F of the cast soft-metal trap. Thus the part of the mold H in which the lower curved portion D of the trap is cast has its branch I, that forms the socket F, made longer than the latter, so as to receive closely within it a removable core, J. This core is reduced at its inner end *e*, forming a mandrel to receive over it the nut G, that is of suitable size to allow of the metal of which the socket F is formed to flow around it, and around a shoulder, *f*, on the inner face of the body of the core in rear of the reduced end *e*, to form the soft-metal facing or seat *d* on the outer end of the socket F for the head of the nut E. The metal of which the trap is made is prevented from running into or filling the nut G, and the embedding of the latter in the metal of the socket perfected, also the opening from the socket to the inside of the trap established by a detachable supplementary core, K, of less diameter than the whole nut or box G, but of sufficient size to cover or close the bore of the nut, and formed with a shank at its outer end to enter the core J, and shaped at its inner end to fit the core L of the curved portion D of the trap.

The two cores J and K, holding the nut or screw-box G in between them, being entered in the mold, as described, the lead or soft metal or composition is then run into the mold, and the trap cast with the hard-metal nut firmly embedded in it, and so as to leave a soft-metal facing or seat, *d*, for the head of the screw, the core J, after the casting is made, being removed from the outside, and the supplementary core K being drawn out from the inside of the trap. The nut or box G may be formed with a flange on either of its ends, and with side ribs *s* to insure its firm hold in the soft metal of the casting, and to prevent the nut from turning. Said nut or screw-box may have the screw-thread formed in it either before its insertion in the mold or after the trap has been cast. Furthermore, it is immaterial, so far as the application of the improvement to a cast trap is concerned, whether the leg and curved portions of the trap be cast in one piece or separate, and whether the top be made with or without a seam in it.

I claim—

1. The combination, with the bend D or cleaning-out opening of a lead or soft-metal stench-trap, of a hard-metal nut, secured in said soft metal, with a portion thereof overlapping or lapping upon the outermost end of said nut, and forming a soft-metal seat, *d*, for the flange or rim of the screw-plug to bear against, and thereby producing a liquid-tight joint, substantially as herein specified.

2. The combination of the lead or soft-metal trap, having a bend, D, the nut or screw-box G, the screw cap or plug E, and the soft-metal seat *d*, substantially as and for the purpose herein specified.

JAMES A. LOWE.

Witnesses:
MICHAEL RYAN,
FRED. HAYNES.